United States Patent [19]

Goto et al.

[11] Patent Number: 4,635,144
[45] Date of Patent: Jan. 6, 1987

[54] TAPE RUNNING CONTROL APPARATUS FOR AUDIO TAPE RECORDER

[75] Inventors: Hideaki Goto; Ichiro Ninomiya, both of Shinagawa, Japan

[73] Assignee: Sony Corporation, Tokyo, Japan

[21] Appl. No.: 749,627

[22] PCT Filed: Oct. 25, 1984

[86] PCT No.: PCT/JP84/00505

§ 371 Date: Jun. 24, 1985

§ 102(e) Date: Jun. 24, 1985

[87] PCT Pub. No.: WO85/02052

PCT Pub. Date: May 9, 1985

[30] Foreign Application Priority Data

Oct. 25, 1983 [JP]  Japan ................. 58-199554

[51] Int. Cl.$^4$ .................. G11B 5/54; G11B 15/22; G11B 27/32
[52] U.S. Cl. ................... 360/72.2; 360/74.4; 360/75
[58] Field of Search ............ 360/72.2, 74.4, 75

[56] References Cited

FOREIGN PATENT DOCUMENTS 53-96803  8/1978  Japan .
56-47629  11/1981  Japan .
57-66557  4/1982  Japan .

*Primary Examiner*—George G. Stellar

*Attorney, Agent, or Firm*—Lewis H. Eslinger; Alvin Sinderbrand

[57] ABSTRACT

A time code signal is reproduced from a running tape of an audio tape recorder and is used to search a desired tape stop position. There are provided time code comparing means (13) for comparing same or difference between data of a reproduced time code indicative of the present tape position and a cue point position at which the tape should be stopped (1), mode control means (14) for producing a mode specifying signal on the basis of the compared result of the time code comparing means (13), and timer control means (15) for producing a head drive signal to permit a reproducing head of the audio tape recorder (1) to contact with or leave the tape on the basis of the outputs from the time code comparing means (13) and the mode control means (14). While the tape is being transported, the time code signal recorded thereon is reproduced by the reproducing head, the time code data indicative of the present tape position and the cue point position at which the tape should be stopped are compared with each other, the tape running mode is controlled on the basis of the compared result and the reproducing head is allowed to contact with or leave the tape in accordance with the compared data and the tape running mode, whereby the abrasion of the head can be reduced and the tape can be stopped positively at the cue point position.

2 Claims, 11 Drawing Figures

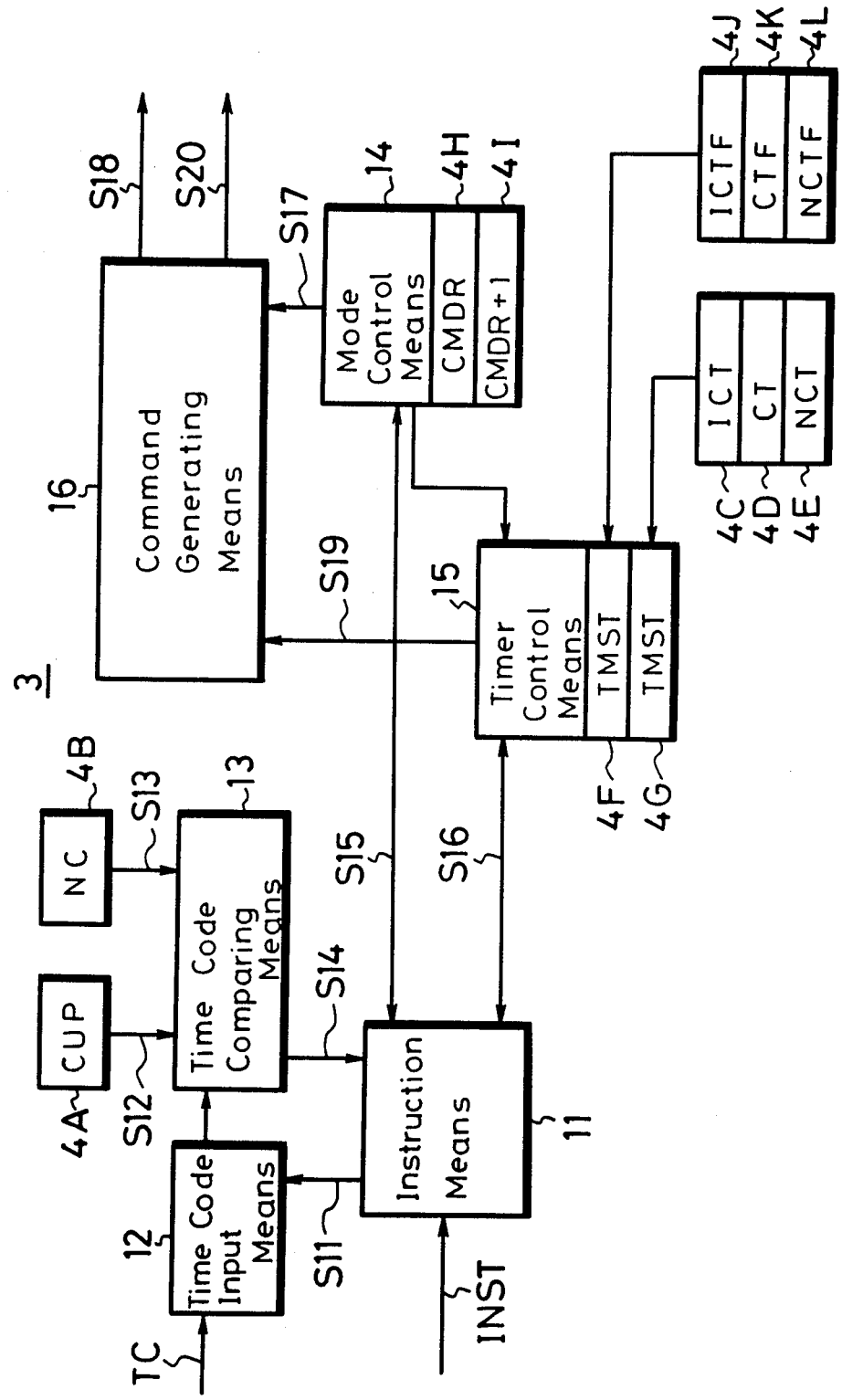

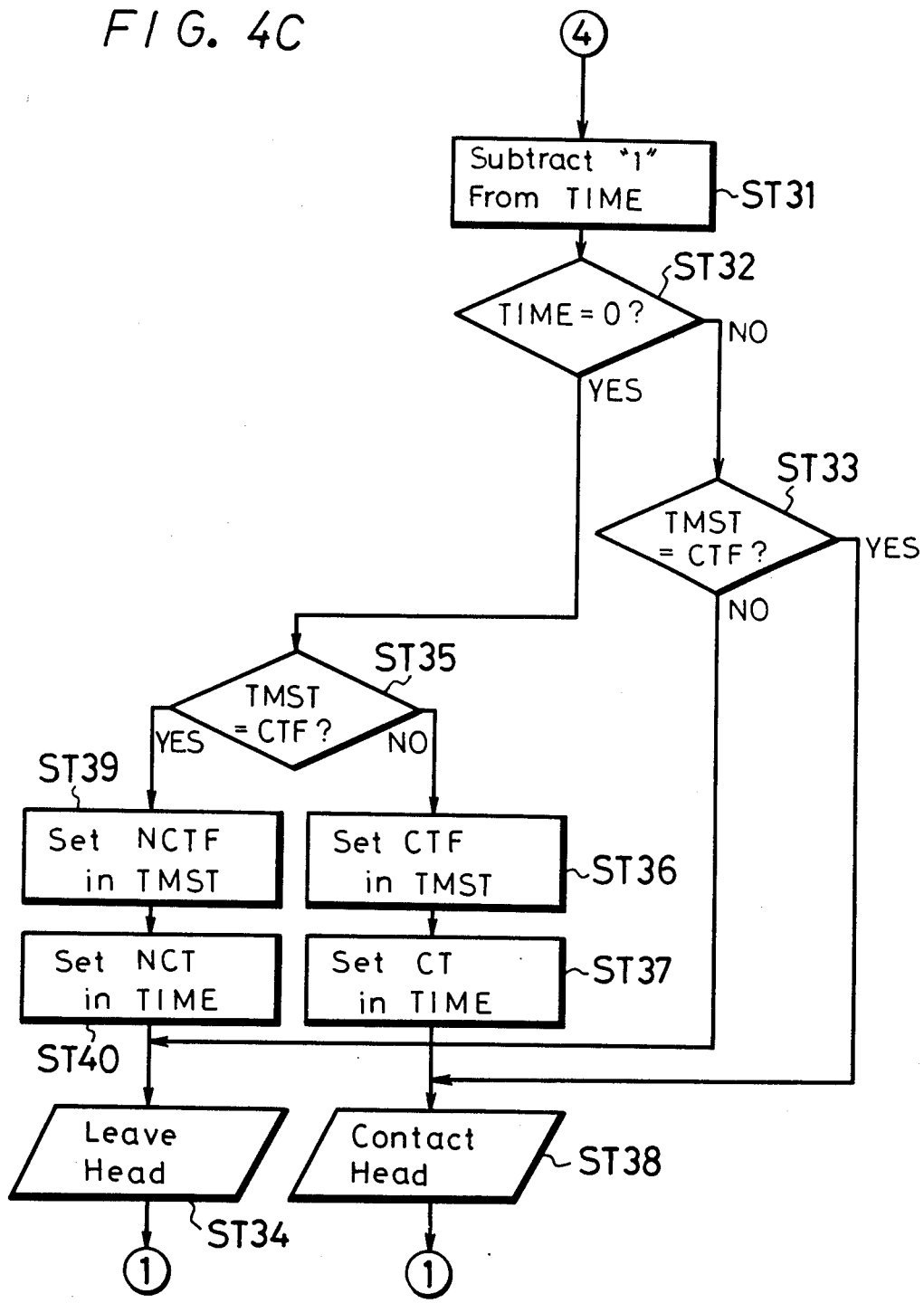

TAPE RUNNING CONTROL APPARATUS FOR AUDIO TAPE RECORDER

1. TECHNICAL FIELD

The present invention relates to a tape running control apparatus for an audio tape recorder in which a tape in transported and a time code signal recorded thereon is reproduced to thereby search a desired tape stop position and then at such position the tape should be stopped.

2. BACKGROUND ART

Some audio tape recorders have a so-called cue-up function in which a cue signal is recorded on the tape on which an audio signal is recorded and is detected so as to stop the tape at the position of this cue signal, or a cue point. Generally, when the tape runs from a desired running position to the cue point position, if the present tape position is distant from the cue point position, in order to search the cue point position as soon as possible, the tape has to run at high speed in fast forward or rewind mode. However, if the tape continues to contact with the head in a high speed running mode, the tape is given an undesired abrasion, so there have been proposed various methods for protecting the tape from such undesired abrasion.

As the first method, there is recorded on the tape a control pulse signal (CTL signal) which changes its logic level at every predetermined tape length, this control pulse is being reproduced by a fixed head at all times, the number of the pulses produced from the fixed head is counted by a counter to thereby detect the transported amount of the tape when it runs at high speed and the counter content is watched, whereby to know that the tape running position approaches the cue point position.

As the second method, in addition to the control pulse signal, a time code signal is recorded on the tape together with the audio signal, in which when the tape is transported at high speed, the reproducing head contacts with the tape intermittently to thereby in a sampling manner reproduce the time code signal as a reference signal, while when the reproducing head leaves the tape, the tape transported amount between the reference signals is interpolated by the reproduced control pulse signal whereby to know that the tape running position approaches the cue point position.

According to these prior art methods, until the tape running position approaches the cue point position, the count data with respect to the tape transported amount is obtained by utilizing the control pulse signal to thereby calculate the distance between the tape running position and the cue point position. However, the control pulse signal does not absolutely represent each tape position essentially but its accumulated value indicates the tape running amount. Therefore, the prior art methods are to indirectly calculate each tape position by utilizing such accumulated value.

For this reason, the prior art methods are limited inherently in increasing the accuracy with which the tape is stopped at the cue point position. In addition, the detected control pulse signal is inevitably disturbed when the tracing direction on the tape is changed, so this requires a circuit for correcting such disturbed control pulse.

In view of such points, this invention is provided in which when the tape is stopped at the cue point position, the fact that the tape running position approaches the cue point position can be positively judged by using a time code to thereby accurately stop the tape at the cue point position and reduce the wear of a reproducing head as much as possible.

DISCLOSURE OF INVENTION

According to the present invention, in order to achieve such objects, on the basis of a time code reproduced signal obtained from the audio tape recorder, a difference between a time code indicating the present tape position and a data indicating a cue point at which the tape should be stopped can be judged by time code comparing means and the tape running mode of the audio tape recorder is specified by mode control means on the basis of the judged result, and a reproducing head of the audio tape recorder is controlled to contact with or leave the tape by timer control means.

BRIEF DESCRIPTION OF DRAWINGS

FIG. 3 is a block diagram showing in detail a circuit arrangement of a tape running and head position control circuit used in the apparatus of FIG. 1; and FIGS. 4A, 4B and 4C are respectively flow charts useful for explaining the operation thereof.

BEST MODE FOR CARRYING OUT THE INVENTION

Figure 1:
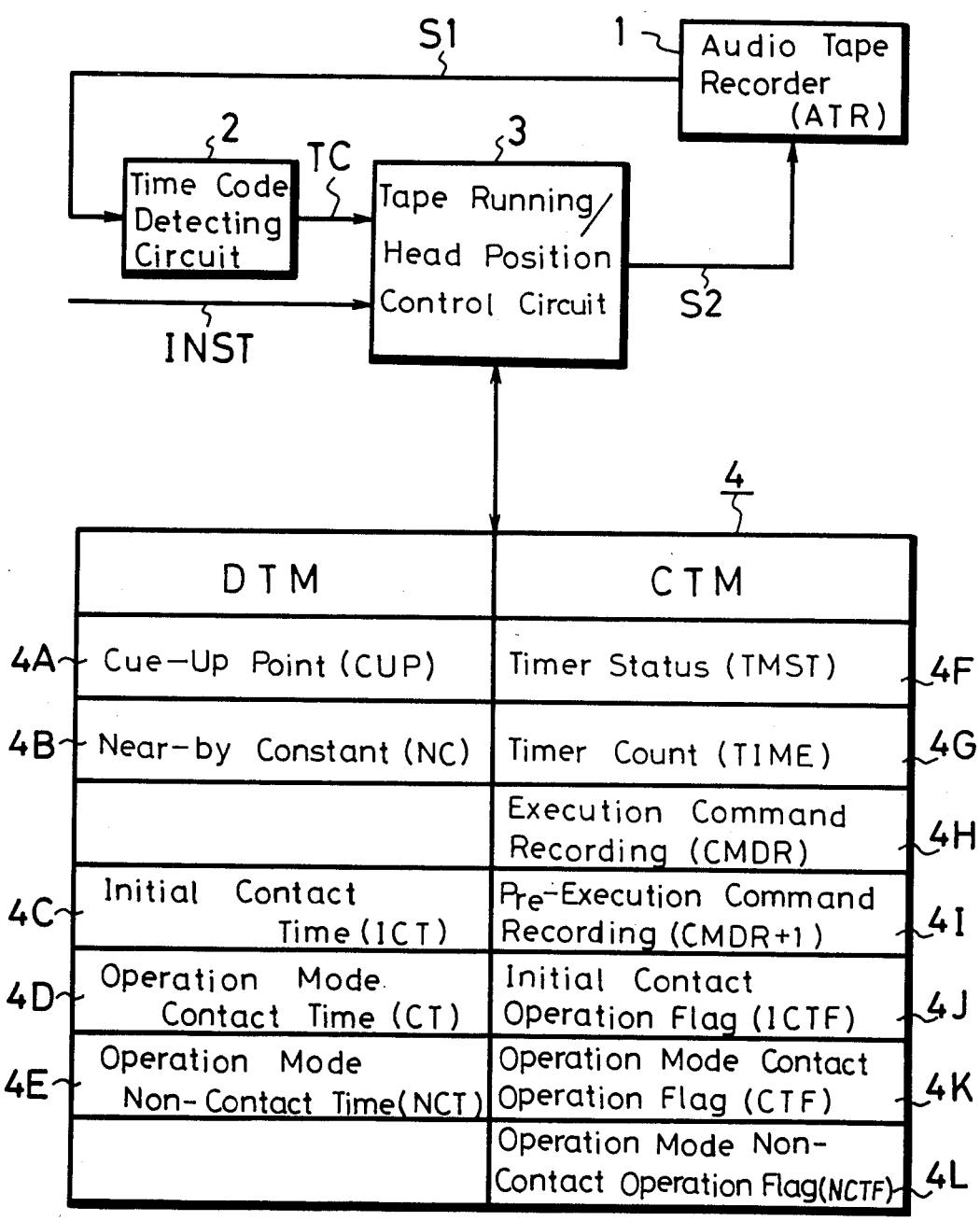
FIG. 1 is a block diagram schematically showing an embodiment of an apparatus according to the present invention.

An embodiment of the present invention will hereinafter be described in detail with reference to the drawings. In FIG. 1, reference numeral 1 designates an audio tape recorder (ATR). A time code reproduced signal S1 reproduced from a tape by this audio tape recorder is supplied to a time code detecting circuit 2 in which it is converted to a time code signal TC and then fed to a tape running/head position control circuit 3. The control circuit 3 separately receives an instruction input signal INST and when the content of the instruction input signal becomes the search start mode, this control circuit supplies a control signal S2 to the tape recorder 1 on the basis of data and flag stored in a memory 4. Thus, the control circuit 3 can control the tape recorder 1 such that the tape can run in a specified mode for a specified time.

Figure 2:
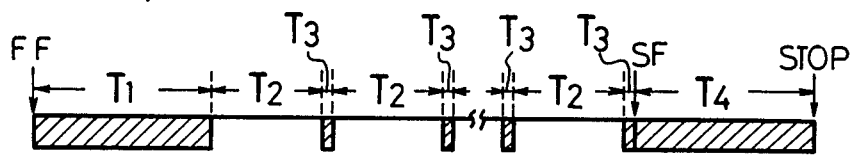
FIG. 2 (A1), FIG. 2 (A2), FIG. 2 (B1), FIG. 2 (B2), FIG. 2 (C1) and FIG. 2 (C2) are respectively diagrams useful for explaining the operation mode thereof.
Figure 2:
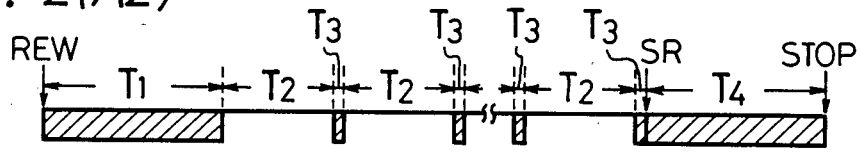
Figure 2:
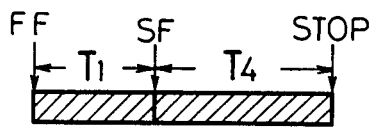
Figure 2:
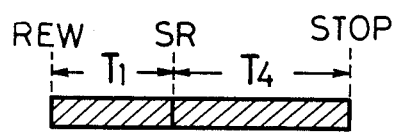
Figure 2:
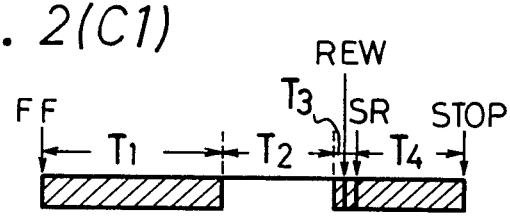
Figure 2:
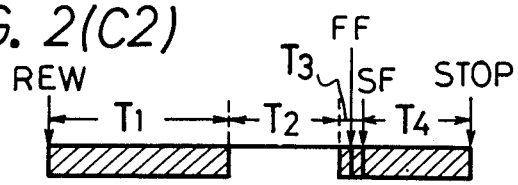

That is, on the basis of whether the present tape position is distant from or near the cue point, i.e., the stop position or whether the tape passes over the stop position or not, the control circuit 3 controls the tape recorder 1 in the modes shown in FIG. 2.

At first, when the tape is distant from the cue point position before the same, if the instruction input signal INST commands the search mode to begin, as shown in FIG. 2 (A1), the control circuit 3 commands the tape recorder 1 to start the fast forward (FF) mode and commands the reproducing head to contact with the tape during a predetermined time T1 (for example, 5 seconds). After the time T1 passed, the control circuit 3 controls the tape recorder 1 such that the reproducing head leaves the tape and that each time a predetermined time T2 (for example, 4 seconds) passes, the reproducing head intermittently contacts with the tape for a short time T3. When the tape running position approaches the cue point position, the control circuit 3 changes the mode of the tape recorder 1 to the slow forward (SF) mode for a moment so that the tape is transported at low speed during a time T4 and is then stopped when the stop position arrives at.

When the instruction input signal INST commands the search mode to begin, if on the other hand the tape running position is located in the direction opposite to the direction of FIG. 2 (A1) and distant from the cue point position, as shown in FIG. 2 (A2) the control circuit 3 controls the tape recorder such that while the reproducing head is in contact with the tape, the tape is transported at high speed in rewind (REW) mode during the predetermined time T1. Then, the reproducing head leaves the tape and each time the time T2 passes, the reproducing head contacts with the tape intermittently during the time T3. Thereafter, the mode of the tape recorder is changed to slow rewind (SR) mode to thereby run the tape at low speed during the time T4 and the tape is stopped when the stop position is arrived at.

Since in the modes of FIGS. 2 (A1) and 2 (A2) the time code signal TC is reproduced from the tape by the reproducing head during the time T1 while the tape is being transported at high speed and then the time code signal TC can be obtained each time the reproducing head comes in contact with the tape at intervals of T2, the control circuit 3 can confirm the absolute position of the tape when the search mode begins and detect intermittently the absolute position of the tape until the tape running position of the tape approaches the cue point position. When thereafter the tape running position of the tape reaches a predetermined position near the cue point position, the tape is transported at low speed and approaches the cue point position while confirming the time code continuously, so that the tape can be stopped accurately at the cue point position by detecting that the time code and the cue point coincide with each other.

Next, if the tape position at the beginning of the search mode commanded by the instruction input signal INST already lies in a predetermined range near the cue point position, as shown in FIG. 2 (B1), the control circuit 3 carries out such a control that while in contact with the reproducing head, first, the tape is transported at high speed in fast forward (FF) mode during the time T1 and then is transported at low speed in slow forward (SF) mode during the time T4 so as to approach the cue point position. When the time code coincides with the cue point, the tape stops its running.

If the tape position at the begining of the search mode is located in the opposite direction to FIG. 2 (B1), as shown in FIG. 2 (B2), the tape is transported at high speed during the time T1 in rewind (REW) mode and then is transported at low speed in slow rewind (SR) mode during the time T4 so as to approach the cue point position. When the time code coincides with the cue point, the tape stops its running.

As described above, since the control circuit 3 can obtain the time code signal TC at all times, the tape can be stopped very accurately at the cue point position.

On the contrary, there is such case that since the tape position at the beginning of the search mode is a little distant from the cue point position, as shown in FIG. 2 (C1), the tape is transported at high speed in fast forward (FF) mode during the time T1 while in contact with the reproducing head similarly to the case of FIG. 2 (A1) and then the reproducing head leaves the tape during the time T2 with the result that the tape running position passes the cue point position. In this case, as shown in FIG. 2 (C1), the control circuit 3 can detect that the tape position passed through the cue point position by the time code signal obtained by making the head contact with the tape during the time T3 after the time T2 passed. On the basis of this detection, the mode of the tape recorder is changed to the rewind (REW) mode. At this time, since the tape is transported at high speed from the cue point position in the reverse direction, the tape is immediately returned to the position near the cue point position. Therefore, the control circuit 3 watches the tape return to that position while the reproducing head still contacts with the tape and changes the mode of the tape recorder to the slow rewind (SR) mode when the tape running position reaches the predetermined position so that the tape is transported at low speed during the time T4 and is then stopped at the cue point position.

There is such a case that the tape position at the beginning of the search mode commanded by the instruction input signal INST is located in the direction opposite to FIG. 2 (C1), then, as shown in FIG. 2 (C2), the control circuit 3 changes the mode of the tape recorder to the rewind (REW) mode to run the tape in the reverse direction during the time T1, the head leaves the tape during the succeeding time T2, and the tape running position passes the cue point position.

In this case, as shown in FIG. 2 (C2), the control circuit 3 can detect that the tape running position passes the cue point position by the time code signal TC obtained by making the head contact with the tape during the time T3 after the time T2 passed. Thus, under the state that the head contacts with the tape, the mode of the tape recorder is changed to the fast forward (FF) mode to thereby run the tape at high speed in the reverse direction for a moment. When the tape running position is approaching the cue point position, the mode of the tape recorder is changed to the slow forward (SF) mode so that the tape is transported at low speed during the time T4 and is then stopped at the cue point position.

As described above, even if the tape running position passes the cue point position, the control circuit 3 can confirm it by detecting the time code signal TC, then transport the tape in the reverse direction and stop the tape at the cue point position.

The tape running/head position control circuit 3 for executing the controls shown in FIG. 2 can be realized by the function of a microprocessor as shown in FIG. 3. In FIG. 3, reference numeral 11 designates instruction means which receives the instruction input signal INST. When the instruction input signal commands the search mode to begin, this instruction means 11 supplies various instructions to respective means in response to such command. That is, at first the instruction means 11 supplies a read instruction S11 to time code input means 12 to make it read-in or store the time code signal TC. The time code data stored in the time code input means 12 is supplied to time code comparing means 13 in which it is compared with output data S12 and S13 of a cue-up point memory 4A and a near-by constant memory 4B each of which functions as a data memory DTM (FIG. 1). This comparing means 13 judges whether the tape running position enters a predetermined near-by range or not by comparing the time code data with the output data S13 and judges whether the tape running position coincides with the cue point position or not by comparing the time code data with the output data S12.

A judged result signal S14 in such time code comparing means 13 is sent back to the instruction means 11 and at this time, the instruction means 11 supplies drive commands S15 and S16 to mode control means 14 and timer control means 15, respectively.

The mode control means 14 includes an execution command recording memory 4H and a pre-execution command storing memory 4I, each of which functions as a control memory CTM (FIG. 1). When a mode instruction signal S17 is supplied to command generating means 16 on the basis of an execution command CMDR stored in the memory 4H, the command generating means 16 supplies a mode drive signal S18 to the tape recorder 1 (FIG. 1). Together with data of the execution command CMDR stored in the memory 4H, data of a pre-execution command CMDR+1 stored in the memory 4I is supplied to the instruction means 11 and the timer control means 15 as their judgement data.

The timer control means 15 includes a timer status memory 4F and a timer count memory 4G, each of which functions as the control memory CTM (FIG. 1). The memory 4F reads out flag signals from a memory 4J having stored therein an initial contact operation flag ICTF, a memory 4K having stored therein an operation mode contact operation flag CTF and a memory 4L having stored therein an operation mode non-contact operation flag NCTF each of which functions as the control memory CTM (FIG. 1), if necessary, stores them as timer status data TMST and forms a head instruction signal S19 on the basis of this data TMST.

The memory 4G latches desired data from a memory 4C having stored therein an initial contact time data ICT, a memory 4D having an operation mode contact time data CT and a memory 4E having stored therein an operation mode non-contact time data NCT each of which functions as the data memory DTM (FIG. 1), if necessary, and executes the timer operation by using the latched data as a timer count data TIME and subtracting "1" from this timer count data TIME on the basis of the clock signal. On the basis of such timer operation time, the head instruction signal S19 is selectively changed over.

The memories 4A to 4L in the circuit arrangement of FIG. 3 are provided in the data memory area DTM and the control memory area CTM of the memory 4 shown in FIG. 1 in practice.

With the above-mentioned circuit arrangement, the control circuit 3 executes the tape running and head moving operations described in connection with FIG. 2 in accordance with procedures shown in flow charts of FIGS. 4A, 4B and 4C. The operation of FIG. 2 (A1) will be described first.

Figure 4A:
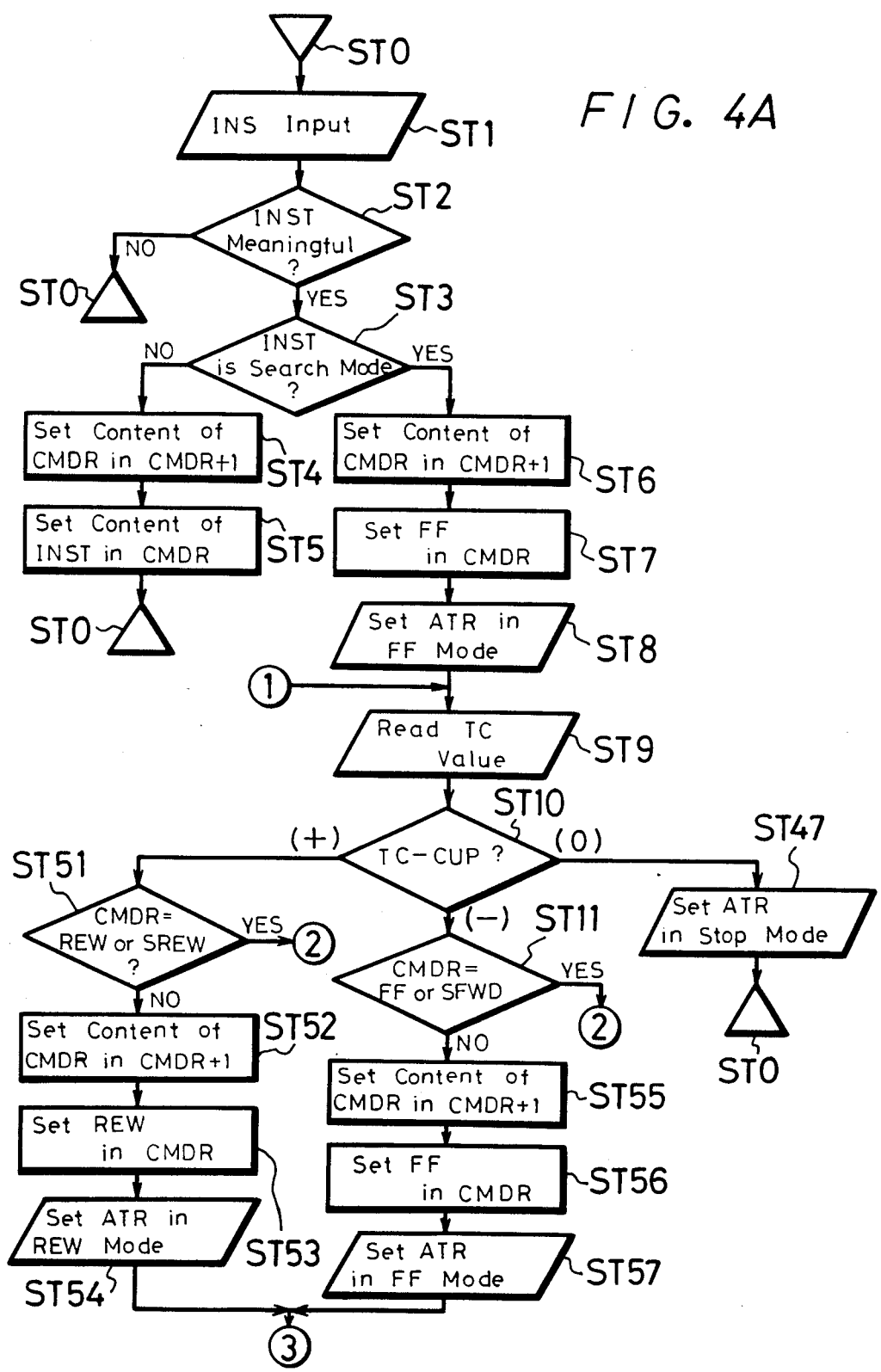
Figure 4B:
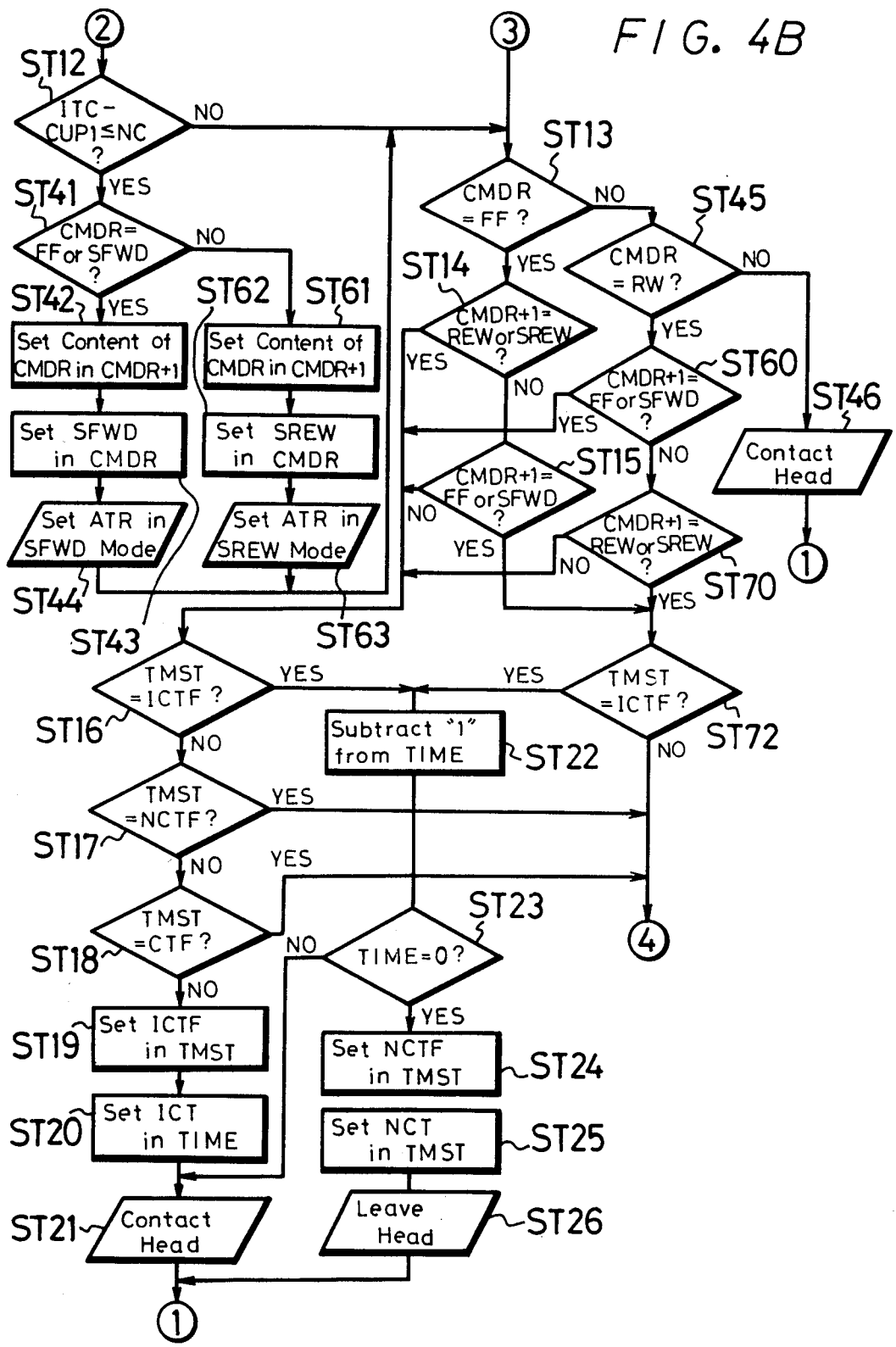

The instruction means 11 begins its operation from a standby step ST0 of FIG. 4A. When supplied with the instruction signal INST at step ST1, the instruction means 11 judges, at next step ST2, whether the instruction signal INST is meaningful or not. If it is meaningless, the step returns to standby step ST0. If, on the other hand, it is meaningful, the instruction means 11 judges, at next step ST3, whether the instruction signal INST has content to start the search mode or not. If not, at step ST4, the instruction means 11 transfers the data stored in the memory 4H to the memory 4I and at next step ST5, stores the present instruction signal INST at the memory 4H in the former and returns to the standby step ST0.

When, on the other hand, the instruction signal INST has the content to start the search mode at step ST3, the instruction means 11 transfers the data stored in the memory 4H of the mode control means 14 to its memory 4I at step ST6 and then supplies a fast forward mode data to the memory 4H at step ST7. At this time, the mode control means 14 supplies the mode instruction signal S17 based on the content of the memory 4H to the command generating means 16 at next step ST8, whereby the mode of the tape recorder 1 is changed over to the fast forward (FF) mode by the mode instruction signal S18. At this time, in the tape recorder 1, the tape is transported at high speed while in contact with the reproducing head.

Since at this time the time code input means 12 is in a state that the time code signal TC is to be supplied thereto, the instruction means 11 supplies the time code input means 12 with the read signal S11 at next step ST9 whereby the value of the time code signal TC is read. This data is supplied to the time code comparing means 13 so that at step ST10 the comparing means 13 judges whether the difference TC-CUP between the value of the time code TC and the positional data of the cue point is one of positive, negative and zero.

If the judged result is negative, since the present tape position is prior to the cue point position, it will be seen that the tape has to be transported in the forward direction. At this time, the instruction means 11 receives the data CMDR of the memory 4H from the mode control means 14 at next step ST11 and judges whether the content thereof is indicative of the fast forward (FF) mode or slow forward (SFWD) mode. If the affirmative result is obtained, at step ST12 (hereinafter see FIG. 4B), the time code comparing means 13 judges whether an absolute value of difference |TC−CUP| between the time code data TC and the cue-up point data CUP is smaller than the near-by constant NC or not.

However, in the case of FIG. 2 (A1), since the present tape position is distant from the cue point position, the comparing means 13 produces a negative result. Therefore, at step ST13, the instruction means 11 instructs the timer control means 15 to latch the data CMDR stored in the memory 4H and to judge whether this data is the fast forward (FF) mode or not. However, in the case of FIG. 2 (A1), since at the above-mentioned step ST7, the fast forward mode data FF is stored in the memory 4H, the affirmative result is obtained so that at the succeeding step ST14, the timer control means 15 judges whether the data CMDR+1 of the memory 4I is the rewind (REW) mode or slow rewind (SREW) mode. Then, at the subsequent step ST15, the timer control means judges whether it is the fast forward (FF) mode or the slow forward (SFWD) mode. In this case, since negative results are obtained in both cases, the operation of the timer control means 15 is moved to the following steps, ST16, ST17 and ST18.

At these steps ST16, ST17 and ST18, it is judged whether the content of the data TMST in the memory 4F is ICTF, NCTF and CTF or not sequentially. In the present state, no data as the timer status data DMST is presented for the memory 4F of the timer control means 15. Therefore, the timer control means 15 inputs the initial contact operation flag data ICTF of the memory 4G to the memory 4F at the next step ST19 and also inputs the initial contact time data ICT of the memory 4C to the memory 4G as the timer count data TIME at the succeeding step ST20. Thus, the timer control means 15 delivers to the command generating means 16 the command instruction signal S19 indicative of the condition that "the mode is the initial contact operation mode and the contact time is ICT". At this time, at step ST21, the command generating means 16 supplies a head drive signal S20 to the tape recorder 1 so as to keep the reproducing head in contact with the tape.

Thus, the tape recorder 1 is put in the state shown by the time T1 of FIG. 2 (A1) and thence the time code signal is being reproduced from the tape which is transported at high speed. Under this state, the operation of the instruction means 11 is returned from step ST21 to the above-mentioned step ST9 and hereinafter, the operations from steps ST9 to ST16 are repeatedly executed. However, if the operation of the step ST16 is executed once again by the timer control means 15, the affirmative judged result is obtained so that the operation of the timer control means 15 is moved to step ST22 at which a value "1" is subtracted from the timer count data TIME of the memory 4G and then at step ST23, it is judged whether the data TIME is zero or not. At this time, since the tape recorder 1 is in the initial state of the interval T1 of FIG. 2 (A1), the negative result is obtained Accordingly, the timer control means 15 continues supplying to the command generating means 16 the head command signal S19 by which the reproducing head is continued to be in contact with the tape. Thus, similarly to the above-described case, the command generating means 16 keeps the head in contact with the tape at step ST21 and thereafter, the operation is returned to step ST9.

Similarly, until the data TIME of the memory 4G becomes "0" at step ST23, the operations through steps ST22 and ST23 to ST19 are repeated. When the time T1 of FIG. 2 (A1) elapses, the data TIME of the memory 4G becomes "0" so that the affirmative result is obtained at step ST23.

At this time, at step ST24, the timer control means 15 latches the operation non-contact operation flag data NCTF of the memory 4L as the timer status data TMST and at a succeeding step ST25, it latches to the memory 4G the operation non-contact time data NCT of the memory 4E as the timer count data TIME. Thus, the timer control means 15 supplies the head command signal S19 to the command generating means 16 as a signal of the content based on the time data under the condition of the operation non-contact operation flag. Accordingly, at the succeeding step ST26, the command generating means 16 supplies to the tape recorder 1 the head drive signal S20 which causes the reproducing head to leave the tape, and thereafter, its operation is returned to the step ST9. Consequently, during the time T2 subsequent to the time T1 of FIG. 2 (A1), the tape recorder 1 permits the tape to run at high speed under the state that the reproducing head is not in contact with the tape.

Under this state, since in the tape recorder 1 the reproducing head is not in contact with the tape, the content of the time code reproduced signal S1 is not updated and the content thereof stays the same. Accordingly, the time code written in when the instruction means 11 supplies the read signal S11 to the time code input means 12 at step ST9 is not placed in such a state as to change the compared result of the comparing means 13 at step ST10. As a result, the instruction means 11 carries out the judgement operation at step ST11 and carries out the operations from steps ST12 to ST16 similar to the above-described cases. In this case, however, at the step ST24, the data NCTF of the memory 4L is latched in the memory 4F as its data TMST so that the negative result is obtained at step ST16 and the affirmative result is obtained at the next step ST17. Accordingly, at step ST31 (hereinafter see FIG. 4C), the timer control means 15 subtracts "1" from the data TIME (at this time, the data NCT from the memory 4E is stored) of the memory 4G and at the next step ST32, the timer control means 15 judges whether the data TIME is zero or not. At this time, since it is immediately after the operation was put into the time T2 or FIG. 2 (A1), the negative result is obtained at step ST32 and the operation is moved to step ST33. At this step ST33, it is judged whether the data TMST of the memory 4F is the operation contact operation flag CTF or not. Since the data stored in the memory 4F as the data TMST is the data NCTF, the negative result is obtained and the operation is moved to step ST34.

At this time, the timer control means 15 supplies to the command generating means 16 the head command signal S19 to move the reproducing head from the tape, whereby the command generating means 16 supplies the head drive signal S20 to the tape recorder 1, keeping the reproducing head spaced apart from the tape. Under this state, the operation is moved to the step ST9 at which the instruction means causes the time code signal to be written. However, at this time, the content of the time code signal TC is not changed at all so that after the operations from steps ST9 to ST17 were carried out once again, the operations from steps ST31 to ST34 are repeated once again. In like manner, such operations are repeatedly executed hereinafter whereby to continuously subtract "1" from the content of the data TIME stored in the memory 4G until the time T2 of FIG. 2 (A1) elapses.

When the content of the data TIME of the memory 4G becomes "0", the timer control means 15 judges this at step ST32 and produces the affirmative result. Then, the operation is moved to step ST35. At step ST35, it is judged whether the data TMST of the memory 4F is the operation contact operation flag CTF or not. However, as will be clear from FIG. 2 (A1), during the time T2, the operation non-contact operation flag NCTF is stored in the memory 4F as the data TMST so that the negative result is obtained. Therefore, the operation is moved to the next step ST36 at which the data CTF of the memory 4K is stored in the memory 4F as its data TMST and at the next step ST37, the operation contact time data CT of the memory 4D is stored therein in the memory 4G as its data TIME. Thus, the cotents of the memories 4F and 4G are replaced, respectively. On the basis thereof, at step ST38, the timer control means 15 supplies to the command generating means 16 the head command signal S19 to contact the reproducing head with the tape. At this time, the command generating means 16 supplies the head drive signal S20 to the tape recorder 1, whereby the reproducing head contacts with the tape and thus the intermittent contact interval T3 begins as shown in FIG. 2 (A1).

At this time, the operation is returned once again to step ST9 just after the step ST38, at which the write operation of the time code signal TC is executed by the time code input means 12. However, at this time, the reproducing head contacts with the tape so that the content of the time code reproduced signal S1 is the time code data which indicates the present tape position. Accordingly, at step ST10, a difference between this new time code data and the cue point is judged. However, at present, since merely, the first intermittent contact of the head occurs as shown in FIG. 2 (A1), the tape position is still located before and far from the cue point. Consequently, the comparing means 13 commands the instruction means 11 that it should be moved to step ST11. Therefore, after the operations from steps ST11 to ST18 were executed once again, the operation is moved to steps ST31 and ST32. However, since the content of the data TIME stored in the memory 4G is rewritten to the data CT at step ST37, after "1" is subtracted from this data at step ST32, the judgement is executed at step ST32. Since the data TIME is not "0", the operation is moved to step ST33 but the data TMST of the memory 4F is the data CTF. Thus at step ST38, the output state of the signal is so maintained as to make the head contact with the tape. Similarly, until the first intermittent interval T3 shown in FIG. 2 (A1) is ended, "1" is being subtracted from the data TIME of the memory 4G through the above-mentioned procedures.

Thereafter, when the data TIME of the memory 4G becomes "0", the affirmative result is produced at step ST32 and the operation advances to step ST35. At this time, since the data TMST of the memory 4F is the data CTF, the affirmative result is obtained and the operation advances to the next step ST39. This step ST39 is such a step that the data TMST of the memory 4F is rewritten once again into the operation non-contact operation flag NCTF. At the next step ST40, the data TIME of the memory 4G is replaced with the operation non-contact time data NCT and then the operation advances to step ST34. At step ST34, the timer control means 15 supplies to the command generating means 16 the head command signal S19 to leave the reproducing head from the tape. This brings the state of the tape recorder 1 to the second head removal time T2 shown in FIG. 2 (A1).

With respect to the first head removal time T2, after the operations from steps ST9 to ST16 were carried out, the processing means at this time executes the operations from steps ST17 to ST31 and repeats further the operations of steps ST32, ST33 and ST34. The operations will be repeated until the second head removal time T2 is ended. After the second head removal time T2 is ended, this is judged at step ST32 and the operation is advanced through steps ST35, ST36, ST37 and ST38 to the second head contact time T3.

At this time, after the operations from steps ST9 to ST17 were executed, the operation advances through step ST18 to step ST31 and then through the operations of steps ST32, ST33 and ST38 the operation is repeated until the time T3 is ended.

When the removal of the head from the tape and the contact therewith are alternately carried out similarly hereinafter, such a state is kept that the head intermittently contacts with the tape which is being transported at high speed in fast forward (FF) mode. Accordingly, the tape running position approaches the cue point position at high speed and during this process, at step ST12, it is judged whether the tape running position reaches the predetermined approach range or not.

When the distance TC-CUP between the tape running position and the cue point position enters the predetermined approach range NC, this is detected by the comparing means 13 at step ST12 and then the operation advances to step ST41. At step ST41, the instruction means 11 judges whether the data CMDR stored in the memory 4H of the mode control means 14 is set in the fast forward (FF) or slow forward (SFWD) mode. As described above in connection with FIG. 2 (A1), since the mode is in the fast forward mode, the above-mentioned positive result is obtained. Thus, the operation is moved to step ST42 at which the data CMDR of the memory 4H is stored as the data CMDR+1 for the memory 4I, and at the next step ST43, the slow forward (SFWD) mode data is stored as the data CMDR in the memory 4H. At step ST44, on the basis of the content of the memory 4H, the mode control means 14 supplies to the command generating means 16 the mode command signal S17 indicating the slow forward (SF) mode, whereby on the basis of the mode command signal S18, the command generating means 16 places the tape recorder 1 to the slow forward mode under which the tape runs at low speed.

Thereafter, the operation is returned to step ST13 at which the data CMDR of the memory 4H is replaced so that the negative result is obtained at step ST13. Thus, the operation advances to step ST45 at which it is judged whether the data CMDR of the memory 4H is the rewind (REW) mode data or not. However, since the present state is the slow forward mode, the negative result is obtained at step ST45 so that the timer control means 15 advances to the next step ST46 to thereby supply to the command generating means 16 the head command signal S19 to contact the reproducing head with the tape. Thus the command generating means 16 delivers the head drive signal S20 to control the tape recorder 1 such that the reproducing head thereof contacts the tape. Therefore, under the state that the reproducing head contacts with the tape being transported at low speed, the tape recorder 1 advances to the head approach time T4 (FIG. 2 (A1)) and continuously delivers the time code reproduced signal S1.

Under this state, the operation is returned to the afore-mentioned step ST9, at which the time code is taken-in by the time code input means 12. Thereafter, the operations through steps ST10 to ST12 and from steps ST41 to ST44 are executed and then the operations through steps ST13 and ST45 to step ST46 are carried out. Then these operations will hereinafter be executed repeatedly. Accordingly, the tape running position is approaching the cue point position at low speed.

In this state, when the tape running position coincides with the cue point position, at step ST10, the comparing circuit 13 judges that the value TC-CUP becomes "0". At this time, at step ST47, the instruction means 11 instructs to deliver the head drive signal S20 to the tape recorder 1 by way of the mode control means 14 and the command generating means 16 and sets the tape recorder in the stop mode. Then, it returns to standby step ST0. At this time, the tape recorder 1 stops the tape under the state that the tape running position coincides with the cue point position.

As described above in connection with FIG. 2 (A1), the control circuit 3 operates as follows. That is, when the tape running position is located far away from the cue point position, the tape is transported at high speed in fast forward mode. Then, the time code signal is detected by contacting the head with the tape to thereby confirm the distance between the present tape running position and the cue point position. After that, the head is made to intermittently contact with the tape whereby to confirm that the tape running position approaches the cue point. Thereafter, when the tape running position enters the approach range NC, the time code is ascertained by contacting the head with the tape. Then, the tape is continued to run in slow forward mode until the time code coincides with the cue point position. Thus the tape can be stopped at the cue point position positively.

The operation of the control circuit 3 will be described in which case the present tape position is distant apart from the cue point position after passing thereover as described above in connection with FIG. 2 (A2). In this case, in FIG. 4A, operations from steps ST0 to ST8 are similar to those of FIG. 2 (A1). Accordingly, the tape recorder is in the fast forward (FF) mode and is set in the state to be able to produce the time code reproduced signal S1 continuously. Therefore, at step ST9, the time code input means 12 takes in the present time code and at step ST10, the comparing means 13 judges whether TC-CUP is positive, negative or zero. At this time, since the tape running position is over the cue point position, the judged result at step ST10 is [+] so that the operation is moved to step ST51, at which it is judged whether the data CMDR of the memory 4H is the rewind (REW) mode data or slow rewind (SREW) mode data. In this case, since the tape recorder 1 is placed in the fast forward (FF) mode at step ST7, the negative result is obtained. At next step ST52, the data CMDR of the memory 4H is placed in the memory 4I as the data CMDR+1. At the next step ST53 the rewind (REW) data is stored in the memory 4H as the data CMDR, the command generating means 16 is controlled by the mode command signal S17 from the mode control means 14 and the tape recorder 1 is placed in the rewind (REW) mode by using the mode command signal S18 at step ST54. Thereafter, the operation is moved to step ST13 and operations from steps ST14 to ST21 are carried out similarly to FIG. 2 (A1), whereby under the condition that the time code reproduced signal S1 is produced by contacting the reproducing head with the tape, the operation mode is moved to the time T1 in which the tape is transported at high speed.

Then, the operation is returned to step ST9 and the operations of steps ST10 and ST51 are carried out. Since at present the rewind (REW) data is stored as the data CMDR of the memory 4H, the affirmative judged result is obtained at step ST51 and the comparing means 13 continues its judgement operation at step ST12.

Since the judgement at step ST12 produces the negative result at present state, the operation is moved to steps ST13 and ST45. At this step ST45, the affirmative result is obtained so that the operation is moved to next step ST60, at which it is judged whether the data CMDR+1 of the memory 4I is the fast forward (FF) mode data or the slow forward (SFWD) mode data. This produces the affirmative result and the operation is moved to step ST16. Similar to the description in connection with FIG. 2 (A1), by the operations of steps ST22, ST23 and ST21, the duration of the time T1 is calculated and after this time elapses, the operation is moved to steps ST23, ST24, ST25 and ST26 and then the time T2 arrives. As a result, on the basis of the affirmative result obtained at step ST17, the duration of the time T2 is calculated by the operations of steps ST31, ST32, ST33 and ST38. After the time T2 passes, on the basis of the affirmative result obtained at step ST32, the operation is moved to step ST35. Thus, the operation for intermittently contacting the reproducing head with the tape which is being rewound is executed.

When such a state is presented in which the affirmative result is obtained at step ST12, the tape running position enters the near-by range NC near the cue point position so that the operation is moved through step ST41 to steps ST61, ST62 and ST63, at which the data CMDR+1 and CMDR of the memories 4I and 4H are replaced. Thereafter, the tape recorder 1 is set in the slow rewind (SREW) mode and the operation is returned to step ST13. At this time, since negative results are obtained at steps ST13 and ST45, the operation is moved to step ST46 at which the tape is transported at low speed until the tape running position reaches the cue point. Thereafter, when it is judged that the value TC-CUP becomes zero at step ST10, the operation is moved to step ST47 and thus the tape recorder 1 is stopped. As described above, the operation mode of FIG. 2 (A2) is realized.

Thirdly, when the present tape position is near the cue point position as described above in connection with FIG. 2 (B1), under the condition that the operation mode is moved to the initial contact operation time T1 and the duration thereof is calculated similarly to FIG. 2 (A1) (during the period in which the calculation at step ST22 and the judgement at step ST23 are carried out and the operation is being moved to step ST21), if the affirmative result is obtained by the comparing operation at step ST12, the operation is carried out in the sequential order of steps ST41 to ST44, step ST13, step ST45 and step ST46. Then, when the tape running position moves in the range NC near the cue point position, the mode of the tape recorder 1 is changed to the slow forward mode in which the tape is transported at low speed and the tape is stopped at the cue point position.

In the fourth situation, in the operation mode of FIG. 2 (B2), similarly to that described above in connection with FIG. 2 (A2), after the tape recorder is set in the rewind mode for a moment under the initial contact mode, on the basis of the judged result of step ST12, the operations of steps ST41, ST61 to ST63, ST13, ST45 and ST46 are carried out and then the tape is stopped at the cue point position.

As mentioned above, when the tape running position is placed near the cue point position, the tape is transported at high speed for a moment, then transported at low speed and during that period the reproducing head is made in contact with the tape so that the tape can be stopped at the cue point while detecting the time code.

If the tape passes over the cue point position as described above in connection with FIG. 2 (C1), the control circuit 3 operates in the following procedures. In this case, the mode is moved to the initial contact operation time T1 and then it is moved to the first intermittent operation times T2 and T3 similarly to the case of FIG. 2 (A1). The state of this case means that during the time T2, the tape running position passes over the cue point position, or overruns it. In this case, at the time T3, the operation returns from step ST38 to step ST9, in which after the value of the time code was written in the time code input means 12 and when the operation is moved to step ST10, the comparing means 13 judges that the value, TC-CUP is positive. In this connection, although the tape running position approaches the cue point position in the fast forward mode, if the tape running position passes over the cue point position, such judgement is carried out.

At this time, the operation of the control circuit 3 is moved to step ST51 and then the negative result is obtained. Then, in accordance with the operations of succeeding steps ST52, ST53 and ST54, the tape recorder 1 is placed in the rewind (REW) mode. At this time, the operation of the control circuit 3 is moved through steps ST13, ST45, ST60, ST61, ST17 and ST18 to ST31. Further, through step ST32, the operations of steps ST33 and ST38 are carried out so that the tape recorder 1 transports the tape at high speed in the rewind mode while the head contacts with the tape.

When the tape running position approaches the cue point position and enters the near-by range NC, this is judged at step ST12 and the operations of steps ST41, ST61 to ST63 are carried out. Further, the operations from steps ST13 and ST45 to step ST46 are carried out, whereby the tape is transported at low speed while in contact with the head. When the tape running position arrives at the cue point position, this is judged at step ST10 and the tape recorder 1 is stopped running at step ST47.

In the sixth situation, in the operation mode of FIG. 2 (C2), when in the initial contact operation mode the rewind mode is presented once as described above in connection with FIG. 2 (A2), if the time code is taken in the operation contact operation time T3 passing over the cue point, the judgement at the step ST10 becomes [−] so that by the operations of steps ST11, ST55, ST56 and ST57, the tape recorder 1 is placed in the fast forward mode. Hereinafter, similar to the description in connection with FIG. 2 (C1), the operations of steps ST33 and ST38 are carried out in which the tape is transported at high speed while in contact with the head. Thereafter, if at step ST12 it is detected that the tape running position enters the near-by range NC, by the operations of steps ST41, ST42 to ST44, ST13, ST45 and ST46, the tape is transported at low speed while in contact with the head. After that, when the time code coincides with the cue point at step ST10, the operation is moved to step ST47 in which the tape is stopped.

As described above, the operation modes of FIGS. 2 (C1) and 2 (C2) can be realized by the control circuit 3.

In the above-described operation modes, if the fast forward mode or the rewind mode is once again specified just after the fast forward mode or rewind mode is presented for a moment, the affirmative result is obtained at step ST15 or ST10 so that the operation is moved to next step ST72 and then to step ST22 or ST31.

While in the afore-mentioned embodiment during the time T4 (FIG. 2) in which the tape is stopped at low speed, the tape is transported in slow forward (SF) mode or slow rewind (SR) mode and then the tape is stopped at the cue point position, it is possible that the slow forward (SF) mode and the fast forward (FF) mode are alternately repeated or the slow rewind (SREW) mode and the rewind (REW) mode are alternately repeated to thereby smoothly decrease the tape speed so that the tape is stopped.

As set forth above, according to this invention, when the tape position is apart from the cue position, the tape recorder is placed in the initial contact operation mode and the tape is transported at high speed while in contact with the reproducing head, whereby to detect the time code of the tape at its present position. Subsequently, the head intermittently contacts with the tape and when under such operation state the tape running position enters the predetermined range near the cue point position, the mode of the tape recorder is switched to the slow forward mode in which while in contact with the reproducing head, the tape is transported at low speed, thus it can confirm that the tape running position arrives at the cue point position. Accordingly, the reproducing head can be protected from being worn unnecessarily. In addition, without using the control pulse (CTL signal), the tape can be positively stopped at the cue point position by using only the time code signal.

We claim:

1. A method of tape running control for use with apparatus that reproduces a time code signal recorded on a tape indicitive of an absolute address of the tape thereby to detect a present address of the tape and which has a time code comparing circuit for detecting an address difference between the present address and a desired address, thereby to indicate a desired tape position and a tape running controller for determining a tape running direction and a tape running speed on the basis of an output signal from the time code comparing circuit and a tape run command signal, thereby to transport the tape to the desired address, and a tape head and moving element for placing the tape head into and out of contact with the tape, the method of tape running control comprising the steps of:

transporting the tape in response to an output signal of the time code comparing circuit and the tape run command signal and placing the tape in contact with a head for a predetermined time period;

transporting the tape at a high speed when the address difference, as detected by the time code and comparing circuit, within the predetermined time period is more than a predetermined value and placing the tape in contact with the head intermittently; and transporting the tape at a low speed within the predetermined time period when the address difference within the predetermined time period is within the predetermined values.

2. In a tape running control apparatus that reproduces a time code signal recorded on a tape indicative of an absolute tape address to thereby detect a present address of the tape and which includes a time code comparing circuit for detecting an address difference between the present address and a desired address indicative of a desired tape position and further includes a tape running controller for determining a tape running direction and a tape running speed, on the basis of an output signal from the time code comparing circuit and a tape run command signal, for use in transporting the tape to the desired address, and a tape head and moving element for placing the tape head into and out of contact with the tape, the tape running controller comprising:

first circuit means, operative in response to an output signal of the time code comparing circuit and the tape run command signal, for transporting the tape and activating the moving element to place the tape in contact with the head for a predetermined time period during said transporting of the tape;

second circuit means operative when the address difference, detected by the time code comparing circuit, during the predetermined time period is more than a predetermined value, for transporting the tape at a high speed and activating the moving element to place the tape in contact with the head intermittently; and third circuit means operative when the address difference within the predetermined time period is within the predetermined value for transporting the tape at a low speed within the predetermined time period.

* * * * *